US012423310B1

United States Patent
Shyani et al.

(10) Patent No.: US 12,423,310 B1
(45) Date of Patent: Sep. 23, 2025

(54) FILTER DIRECTION MODIFICATIONS TO VECTOR-BASED SEARCH

(71) Applicant: Amazon Technologies, Inc., Seattle, WA (US)

(72) Inventors: Milind Arjanbhai Shyani, Newark, CA (US); Yonatan Naamad, Sunnyvale, CA (US); Supriya Nagesh, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 107 days.

(21) Appl. No.: 18/542,378

(22) Filed: Dec. 15, 2023

(51) Int. Cl.
*G06F 16/2457* (2019.01)
*G06F 16/22* (2019.01)
*G06F 16/248* (2019.01)

(52) U.S. Cl.
CPC .... *G06F 16/24573* (2019.01); *G06F 16/2237* (2019.01); *G06F 16/248* (2019.01)

(58) Field of Classification Search
None
See application file for complete search history.

(56) References Cited

U.S. PATENT DOCUMENTS

| 10,162,886 | B2 | 12/2018 | Wang et al. | |
| 2014/0121985 | A1* | 5/2014 | Sayood | G16B 40/00 702/19 |
| 2020/0026772 | A1* | 1/2020 | Wheeler | G06F 16/248 |
| 2021/0216576 | A1 | 7/2021 | Staub | |
| 2022/0122306 | A1* | 4/2022 | Lin | G06F 18/2163 |

OTHER PUBLICATIONS

"Filtered Vector Search," retrieved via the Way Back Machine, Aug. 3, 2023, pp. 1-10. (current version available at https://weaviate.io/developers/weaviate/concepts/prefiltering).
James Briggs, "The Missing WHERE Clause in Vector Search," Pinecone Systems, Inc., retreived from the Way Back Machine, Nov. 23, 2023, pp. 1-25. (current version available at https://www.pinecone.io/learn/vector-search-filtering/).

* cited by examiner

*Primary Examiner* — Yu Zhao
(74) *Attorney, Agent, or Firm* — S. Scott Foster; Kowert, Hood, Munyon, Rankin & Goetzel, P.C.

(57) ABSTRACT

Filter direction modifications are performed in vector-based searches. A query data item is obtained along with a data item filter to perform a data item search on a set of data items. A query vector that represents the query in feature space is generated and modified using a filter vector obtained from a matrix of filter vectors generated for the data item filters. The modified query vector is used to perform a search technique to identify data items to return as a result for the search.

20 Claims, 7 Drawing Sheets

FILTER DIRECTION MODIFICATIONS TO VECTOR-BASED SEARCH

BACKGROUND

Data sets serve as the backbone for many systems, services, or applications. In order for these systems, services, or applications to obtain specific data, different techniques for indexing or organizing the data sets are implemented. These indexing or organizing techniques may make the data sets searchable.

Figure 1:
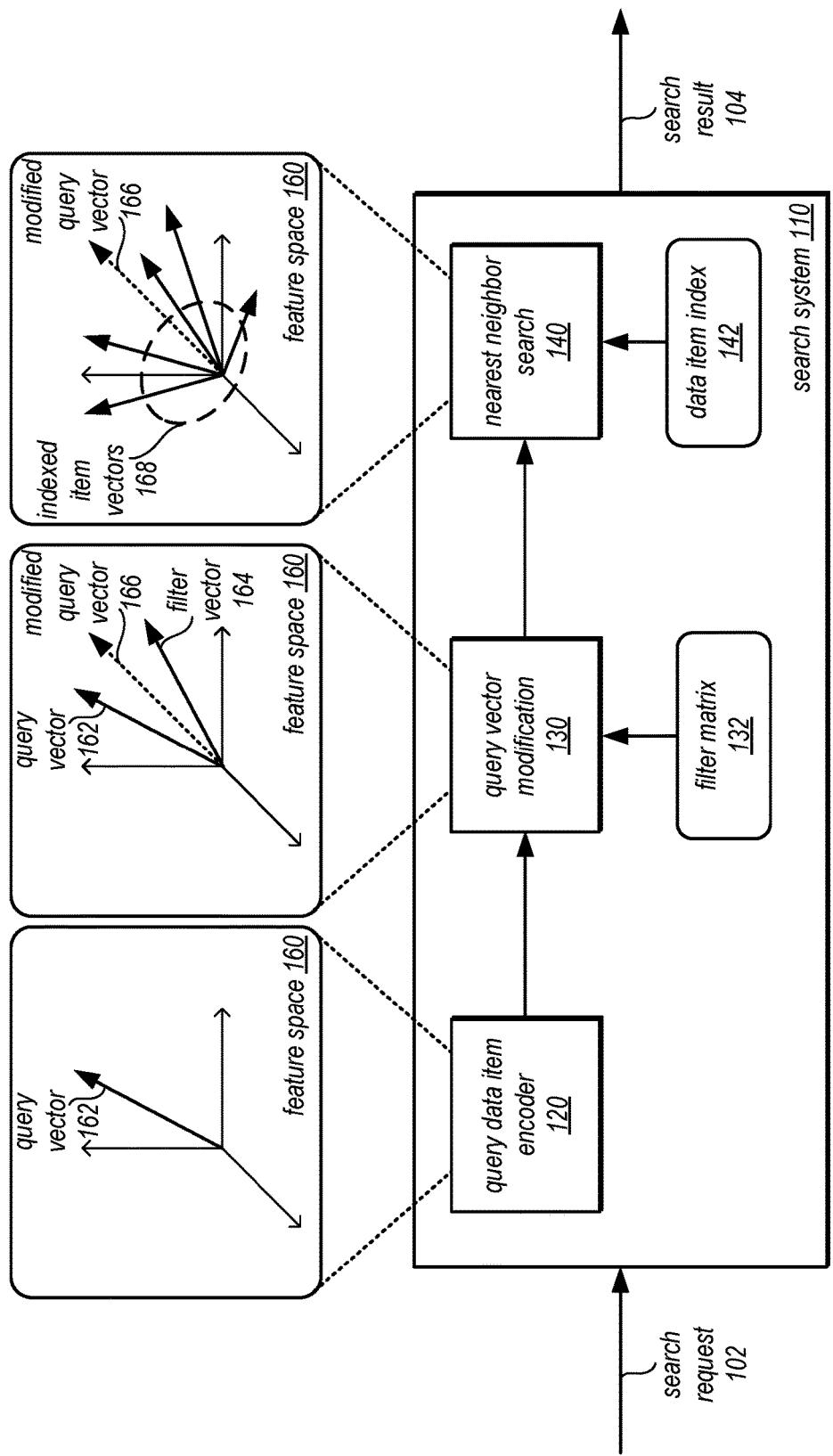
FIG. 1 illustrates a logical block diagram of filter direction modifications to vector-based search, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as described by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Machine learning refers to a discipline by which computer systems can be trained to recognize patterns through repeated exposure to training data. In unsupervised learning, a self-organizing algorithm learns previously unknown patterns in a data set without any provided labels. In supervised learning, this training data includes an input that is labeled (either automatically, or by a human annotator) with a "ground truth" of the output that corresponds to the input. A portion of the training data set is typically held out of the training process for purposes of evaluating/validating performance of the trained model. The use of a trained model in production is often referred to as "inference," during which the model receives new data that was not in its training data set and provides an output based on its learned parameters. The training and validation process may be repeated periodically or intermittently, by using new training data to refine previously learned parameters of a production model and deploy a new production model for inference, in order to mitigate degradation of model accuracy over time.

There have been many developments in large-scale machine learning and deep learning models. These advanced machine learning techniques have provided performance improvements to many difficult computing challenges. For example, performing natural language (e.g., human speech) searches over large data sets has leveraged the capabilities of transformer-based machine learning models that are trained to encode the features of natural language text (e.g., in documents or other data items that include or have associated natural language text, such as image captions) in order to improve the performance of searches by using the encoded form (e.g., a vector where each vector dimension represents a different feature of a represented item) of search input (e.g., a text string) to compare with encoded forms of indexed data items. Because the encoded forms generated by transformer-based machine learning models can capture the semantic similarity or relevance of one item with another in the feature space of encoded forms, search techniques, such as k-nearest neighbor (k-NN), can be performed to efficiently retrieve some number (k) of results that are most similar or relevant to the search input.

While search techniques using vectors have greatly improved the ability of search systems to provide relevant search results, the addition of additional criteria on top of the search input remains a challenge to providing high quality results. For instance, although the feature space (e.g., the possible values of different features represented by the different dimensions of a vector) may be able to co-locate some items in feature space without the filter, the filter itself may be located in a different part of the feature space than the items targeted by the query input (e.g., the color "red" may be located in a feature space that is distant from "car" or "sweater") making difficult to filter search results with the additional criteria. While some techniques to address this challenge have relied upon pre-processing or post-processing techniques to impose filter criteria upon vector-based search results, or created custom indexes particular to specific filters, such solutions can increase the time to perform searches, reduce accuracy, and/or utilize additional storage capacity or require application customization to deploy.

Pre-processing techniques and post-processing techniques may apply filter criteria (e.g., an "color" index to filter out items that do not have the specified color, like "red") before or after searching the indexed set of items. Pre-processing techniques may either generate filter-specific indexes for the set of items (e.g., an index filtered by "color"), which could result in a large number of indexes to support different filter criteria, or may apply a separate filter index used to identify items that satisfy a particular filter value (e.g., "red"), which may then have be searched using a brute force search technique that compares every remaining embedding with the embedding of the query input (which can greatly increase query processing time for large sets of items). As for post-processing techniques, similar challenges arise. A separate index filter is applied to the results of an initial search (e.g., a nearest neighbor-based search) on the indexed set of items. The application of the separate index filter after the results may reduce or eliminate valid results if the number of initial results returned is small or may cause a large post-search workload if the number of initial results returned is large (which again can greatly increase query processing time).

Various techniques of filter direction modifications to vector-based search are described herein which can support the use of filters for vector-based search that improve (or do not negatively impact) search performance time, accuracy, and without significant additional storage capacity. Unlike pre-processing techniques, filter direction modifications to vector-based search does not alter the vector based search technique used (e.g., nearest neighbor techniques, such as Approximate Nearest Neighbor (ANN) or k-NN). Unlike post-processing techniques, filter direction modifications to vector-based search can obtain reliable results with a single search of the indexed items. Moreover, in various embodiments, techniques of filter direction modifications to vector-based search can be implemented independent of the underlying machine learning models to generate vectors, without rebuilding existing search indexes, or the underlying search techniques in the feature space.

Filter direction modifications to vector-based search provide better filtering by finding and using a relevant subspace to a filter in the feature space that corresponds to a particular filter. These relevant subspaces may be efficiently approximated for different filters and which can then be used to guide the vector-based search to relevant items in that subspace. To approximate a relevant subspace for a given filter term, the set of vectors that belong to the relevant subspace can be approximated by determining a relevant filter direction, which can then be applied (e.g., combined using vector mathematical operations) to a query vector in order to redirect that vector into the relevant subspace. In this way, search techniques that search for other items relative to the position of the query vector may naturally search for items near to the query vector in the relevant subspace. Different techniques, as discussed in detail below, may be performed to determine the relevant filter direction for each filter criteria that is to be supported for searching a set of items. Linear probe techniques, for example, may train a matrix representing the set of different filter directions based on the filter terms and vectors (e.g., embeddings) of items that are indexed so that the each filter direction stored in the matrix represents the relevant subspace and can be applied quickly and efficiently when a query with a given one (or more) filter criteria is received.

FIG. 1 illustrates a logical block diagram of filter direction modifications to vector-based search, according to some embodiments. Search system 110 may be a standalone application, system, or service, or may be implemented as part of a larger set of systems or services, such as search service discussed in detail below with regard to FIG. 2.

Search system 110 may accept search requests for a set of data items and perform filter direction modifications in order to apply a filter to the search request. For example, a search request 102 may be received. The search request may include be a text string, such as natural language phrase, or other query data item (e.g., a document). Additionally, a filter may be selected, specified, or applied for the search. The filter may be one of a set of supported filters, which are pre-defined, in some embodiments.

Search system 110 may implement query data item encoder 120, which may take the query data item (e.g., natural language phrase) and encode it using a trained machine learning model (e.g., a natural language model). As depicted in FIG. 1, the query data item may be encoded into a query vector 162 in feature space 160. The query vector may be provided to query vector modification 130, which may utilize filter matrix 132. Filter matrix 132, as discussed in detail below with regard to FIGS. 3 and 6, may be generated to provide filter vectors that guide search to the relevant subspace of feature space 160. Each row of filter matrix 132 may correspond to a different filter vector that represents the direction of that filter (and thus the relevant subspace of that filter). Once obtained, query vector modification 130 may add the filter vector 164 to the query vector 162 to produce a modified query vector 166, as depicted in FIG. 1.

Modified query vector 166 may then be provided to nearest neighbor search 140, which may utilize data item index 142 to identify a number of similar or relevant data items to include in the search result 104. For example, as depicted in FIG. 1, various indexed item vectors 158 may be compared with modified query vector 166 (which result in a filtered set of results different from those results that would have been returned if query vector 162 were used.

Please note that the previous description of a search system is a logical illustration and thus is not to be construed as limiting as to the implementation of other embodiments.

This specification continues with a general description of a provider network that implements multiple different services, including a search service that may implement filter direction modifications to vector-based search. Then various examples of the search service, including different components, or arrangements of components that may be employed as part of implementing the search service are discussed. A number of different methods and techniques to implement filter direction modifications to vector-based search are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
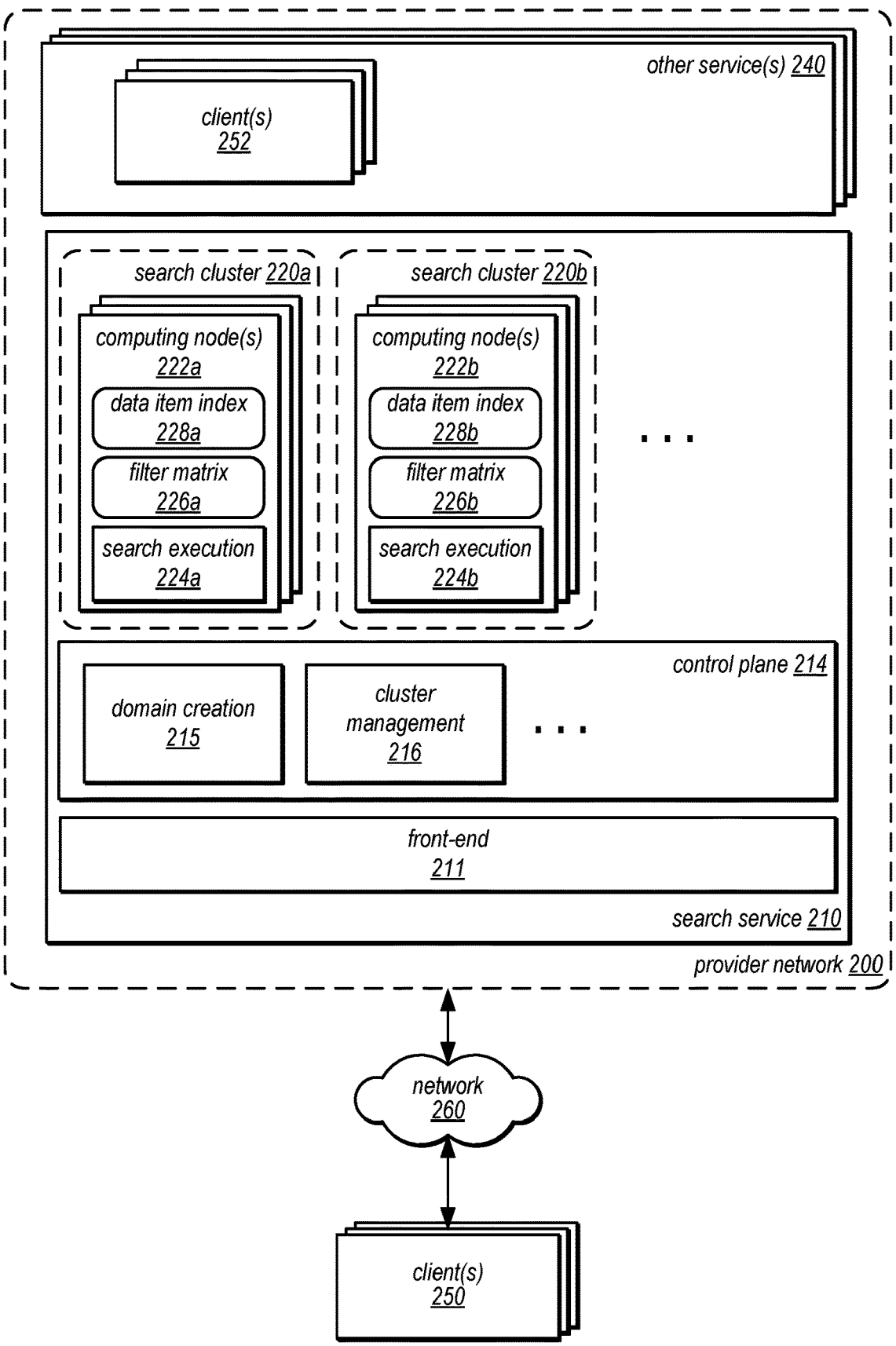
FIG. 2 illustrates an example provider network that may implement a search service that implements filter direction modifications to vector-based search, according to some embodiments.

FIG. 2 illustrates an example provider network that may implement a search service that implements filter direction modifications to vector-based search, according to some embodiments. Provider network 200 may be a private or closed system, or may be set up by an entity such as a company or a public sector organization to provide one or more services (such as various types of cloud-based storage) accessible via the Internet and/or other networks to clients 250, in one embodiment. Provider network 200 (which may, in some implementations, be referred to as a "cloud provider network" or simply as a "cloud") refers to a pool of network-accessible computing resources (such as compute, storage, and networking resources, applications, and services), which may be virtualized or bare-metal. Provider network 200 can provide convenient, on-demand network access to a shared pool of configurable computing resources that can be programmatically provisioned and released in response to customer commands. These resources can be dynamically provisioned and reconfigured to adjust to variable load. For example, in some embodiments, provider network 200 may implement various computing resources or services, such as search service 210, and/or any other type of network-based services 240 (which may include a virtual compute service and various other types of storage, database or data processing, analysis, communication, event handling, visualization, data cataloging, data ingestion (e.g., ETL), security services, content distribution services, such as audio or video broadcasting services), in some embodiments.

The provider network 200 can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the provider network 200 via a publicly accessible network (e.g., the Internet, a cellular communication network). Regions are connected to a global network which includes private networking infrastructure (e.g., fiber connections controlled by the cloud provider) connecting each region to at least one other region. The provider network 200 may deliver content from points of presence outside of, but networked with, these regions by way of edge locations and regional edge cache servers. This compartmentalization and geographic distribution of computing hardware enables the provider network 200 to provide low-latency resource access to customers on a global scale with a high degree of fault tolerance and stability.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 7 and described below, in one embodiment. In various embodiments, the functionality of a given system or service component (e.g., a component of machine learning model-based search service 210 may be implemented by a particular node or may be distributed across several nodes. In some embodiments, a given node may implement the functionality of more than one service system component (e.g., more than one data store component).

Search service 210 may implement front-end 211 to allow clients (e.g., client(s) 250 or clients implemented internally within provider network 200, such as a client application hosted on another provider network service like an event driven code execution service or virtual compute service that utilizes search for other service purposes, like client(s) 252) to handle requests to create search domains and perform search requests on search domains. For example, front-end 211 may implement interface various types or styles of interface (e.g., a graphical user interface (GUI), programmatic interface that implements Application Program Interfaces (APIs) and/or a command line interface) so that a client can request submit various requests, including the various requests as discussed in detail below with regard to FIGS. 3-4.

Search service 210 may implement control plane 214, which may implement various features, systems, or services for managing the resources that implement search service 210. For example, search service 210 may implement domain creation 215. Domain creation 215, as discussed in detail below with regard to FIG. 3, may handle requests to create search domains, including the generation of various artifacts used by that search domain, such as indexes for performing search, as well as filter matrices, and procuring resources, such as a search cluster, like search clusters 220a and 220b, on which to deploy a created search domain. Once created, additional features, such as the application of filter criteria can be added to an existing search domain using the techniques discussed above with regard to FIG. 1 and below with regard to FIGS. 3-7, without having to modify the existing index for the search domain. Search service 210 may also implement cluster management 216 which may monitor the performance of search clusters 220a and 220b, checking for performance problems, failures, other performance concerns to satisfy service level agreements (SLAs) offered by search service 210. For example, cluster management 216 may receive heartbeat communications to check for liveness of search clusters 220 and may receive cluster utilization of computing nodes 222 to determine whether a search cluster 220 is appropriately scaled to the workload on the search cluster.

In various embodiments, search domains created to support search requests over a set of data items may be hosted or deployed on a search cluster, such as search clusters 220a and 220b. Search clusters may include a number (e.g., one or more) of computing node(s), such as computing node(s) 222a and 222b, to share the workload of performing search requests on behalf of clients. Features, such as search execution 224a and 224b, discussed in more detail below with regard to FIG. 4, as well as search artifacts, such as data item index 228a and 228b and filter matrix 226a and 226b, may be distributed evenly amongst computing node(s) 222a and 222b, or different roles or functions may be assigned to different computing nodes of a search cluster for a search domain (e.g., one node performs filter modification and another node performs search).

Generally speaking, clients 250 may encompass any type of client that can submit network-based requests to provider network 200 via network 260, including requests for search service 210 (e.g., a request to retrain a prediction model for a time series, etc.). For example, a given client 250 may include a suitable version of a web browser, or may include a plug-in module or other type of code module that can execute as an extension to or within an execution environment provided by a web browser. Alternatively, a client 250 may encompass an application such as an application that may make use of search service 210 to implement various applications. For example, a client 250 may utilize a data item index 228a to perform a search request, which may be dispatched via front-end 211 to search cluster 220a. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. Clients 250 may convey network-based services requests (e.g., access requests to read or write data may be via network 260, in one embodiment. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks, in one embodiment. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

Figure 3:
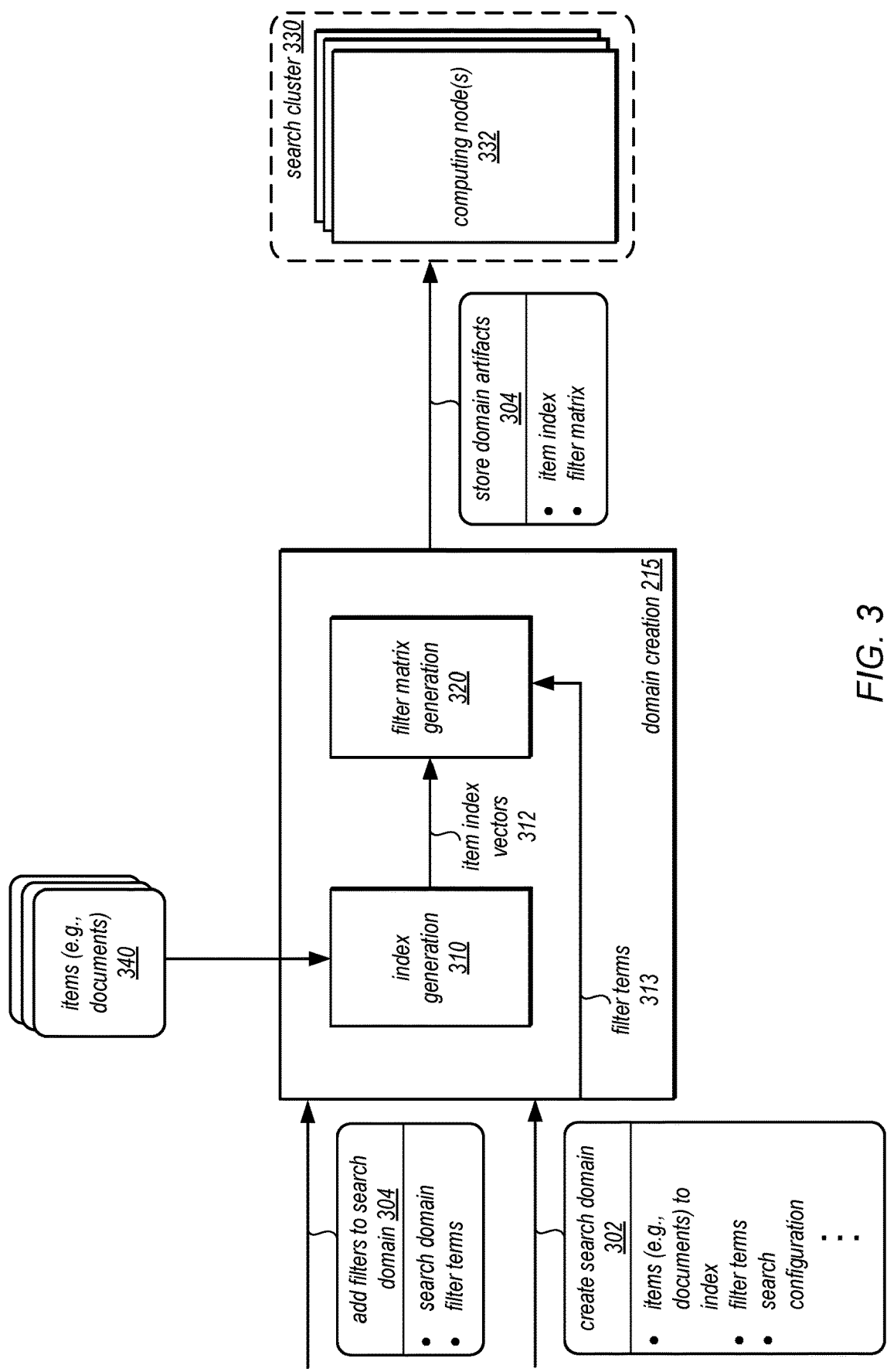
FIG. 3 illustrates a logical block diagram illustrating search domain creation that generates a filter matrix for filter direction modifications to vector-based search, according to some embodiments.

FIG. 3 illustrates a logical block diagram illustrating search domain creation that generates a filter matrix for filter direction modifications to vector-based search, according to some embodiments. Domain creation 215 may manage, execute, or otherwise facilitate the creation of search domains on behalf of clients of search service 210. For example, a request to create a search domain 302 may be submitted via the various types of interfaces discussed above with regard to front-end 211 of FIG. 2, including programmatically (e.g., via an API), graphically (e.g., via GUI element), or through a command line interface.

Create search domain request 302 may include or specify various features, including the documents to index. This request 302 may allow users to create general search domains or, as discussed in detail below, search domains that support the use of filter terms applied to the search, taking advantage of the numerous performance advantages discussed above with regard to FIG. 1. A storage location, file or other data object, or other identifier for the documents (e.g., documents 340) to index may be provided in create search domain request 302 in order to support index generation 310. In some embodiments, access credentials or other permission/authorization information may be provided (or be configured prior to sending create search domain request 302) in order to obtain the documents. Although not depicted in FIG. 3, in some embodiments, an index of documents (or other data items) may already have been generated and may be provided as part of the request 302 to create the search domain instead of the documents to index.

As discussed in detail above with regard to FIG. 1, filter direction modifications to vector-based search may be implemented to provide relevant, filtered search results without the drawbacks of pre-processing and post-processing filter techniques. Accordingly, by providing the filter terms to support, domain creation 215, can generate a filter matrix, as indicated at 320, without changing or affecting the index for the items. For example, the index could be generated at 310 or generated elsewhere and then provided to search service 210. In either case filter matrix generation 320, can generate the filter matrix to apply filtering on the given filter terms to support identified increate search domain request 302. For example, a document, such as Javascript Object Notation (JSON) or other data format, may be used to specify the different filter terms to support. In some embodiments, pre-selected lists of categories for different domains may be implemented by search service 210 and selected in create search domain request 302 (with or without modification).

Various other features may be specified or included in create search domain request 302. Search configuration, for instance, may be used to determine which search technique is performed. Additionally, features which control the strength of the filter applied when performing search, denoted as A, may be specified in the search configuration. In this way, search domains can be created (and updated) and configured in different ways, which may provide custom search performance for different search domains.

Another request that may be supported is a request to add filters to a search domain 304. This request, like request 302, may include the desired filter terms to support, which may be provided along with the item index vectors for the index of the search domain specified in the request in order to generate the filter matrix and provided it to the search cluster (e.g., 330) to support search requests with the filter terms.

Index generation 310 may generate a document index or other item index given a set of items 340 (e.g., documents). To generate the index, individual index vectors for individual documents (or other data items for other types of data items that are indexed for a search domain), are generated using an encoder of a trained machine learning model. For example, different machine learning models may be trained to encode different data items into feature space according to different sets of features (e.g., text-based machine learning models may encode text, including documents according to features determined from a given text, image-based machine learning models may encode image data according to features determined from a given image, and so on). Generating the item index allows for general search techniques to be performed. Also, generation of the item index allows for filter direction modifications to vector-based search to be applied to query vectors prior to searching the item index at a search cluster according to the techniques discussed below with regard to FIG. 4.

Filter matrix generation 320 may implement techniques to generate a filter matrix that represents different directions of filters in the feature space to use to perform filtered search requests, as discussed in detail below with regard to FIGS. 4 and 6. Both the filter terms, as indicated at 313, and the item index vectors, as indicated at 312, may be used as part of filter matrix generation 320. The item index vectors may be obtained when an index is generated, as indicated at 312, when creating a new search domain, or obtained from an existing index when adding filtered search capability to an existing search domain (e.g., to perform request 304).

Although not illustrated, domain creation 215 may perform various other tasks, operations, or workflows to provision and/or deploy resources for a created search domain, such as search cluster 330, including computing node(s) 332. Search cluster 330 and computing node(s) 332 may be similar to search clusters 220a and 220b and computing node(s) 222a and 222b discussed above with regard to FIG.

2. Once provisioned for the search domain, domain creation 215 may store the generated domain artifacts 304, such as document index and filter matrix to search cluster 330 for subsequent use.

Figure 4:
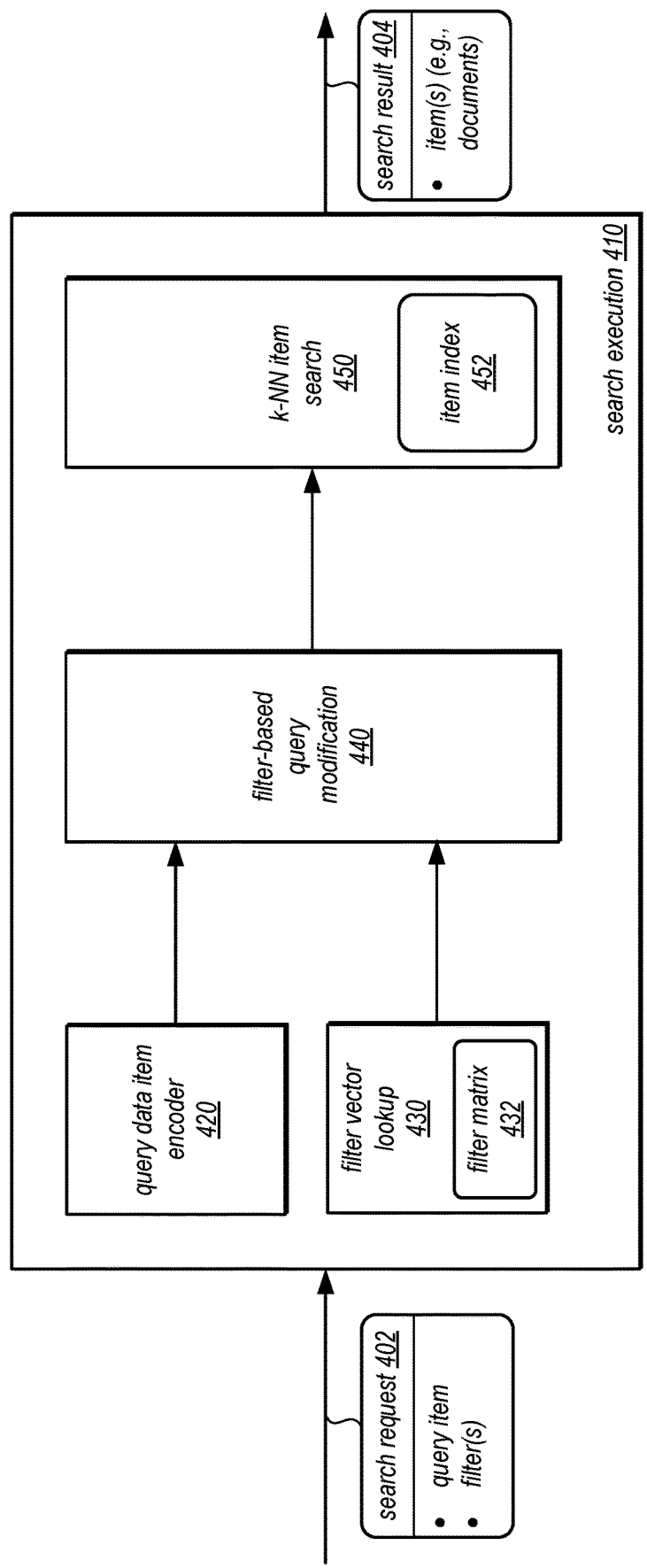
FIG. 4 illustrates a logical block diagram illustrating search execution for a created search domain using filter modifications to perform a vector-based search, according to some embodiments.

FIG. 4 illustrates a logical block diagram illustrating search execution for a created search domain using filter modifications to perform a vector-based search, according to some embodiments. Search execution 410, which may be similar to search execution 224a and 224b implemented on computing node(s) of a search cluster, handles search requests for a created domain. For example, search request 402 may be received that is directed to a created domain for a collection of documents (or other data items) and deployed or otherwise assigned to a search cluster that hosts search execution 410.

Search request 402 may be submitted via the various types of interfaces discussed above with regard to front-end 211 of FIG. 2, including programmatically (e.g., via an API), graphically (e.g., via GUI element), or through a command line interface. Search request 402 may include or specify multiple features, such as a query item and one or more filters. Although not depicted in FIG. 4, other features may be specified or included in search request 402. For instance, the search configuration (as discussed above with regard to FIG. 3), may be modified, to replace the search technique or adjust parameters of search execution, such as the filter weight (1), discussed below.

Search execution 410 may implement query data item encoder 420. Query data item encoder may be an encoder portion (e.g., one or more layers of a neural network) of a trained machine learning model. This trained machine learning model may be the same trained machine learning model used to encode documents in item index 452 (as discussed above with regard to FIG. 3). Query data item encoder 420 may take the query item, generate the vector of the query data item, and provide the vector of the query data item to filter-based query vector modification 440. In the illustrated example where the data items are documents, the query item may be a text string and/or document. Filters for documents may be specific to the domain (e.g., different legal document types, such as contracts, wills, letters, complaints, or responses, among others, when the search domain is legal documents).

Search execution 410 may implement filter vector lookup 430. Filter vector lookup 430 may maintain an index or other mapping that maps individual filters to individual rows in the filter matrix 432 (which may be generated as discussed above with regard to FIG. 3 and below with regard to FIG. 6). When a filter is identified for a search request 402, then the corresponding row in the matrix is read to produce the filter vector from the individual column values in that row. Filter vector lookup 430 may provide the filter vector to filter-based query modification 440.

Search execution 410 may implement filter-based query modification 440 to generate a modified vector for performing search request 402 using the filter vector and query data item vector. In some embodiments, search service 21 may support multiple filters specified for a single search request 402. For such requests, each corresponding filter vector for the multiple filters may be obtained at filter vector lookup 430 in order to modify the data query item vector. Filter-based query modification 440 performs vector modification. As discussed below with regard to FIG. 5, vector modification is performed using both the obtained filter vector(s) and the initial query vector. For example, vector addition may be performed to add the values of the same features in a vector together to produce the modified features. Filter-based query modification 440 then provides the modified vector to k-NN search 450.

Search execution 410 may implement k-NN document search to perform one (or more) versions of k-NN search on a set of documents using item index 452. As discussed in detail below, Euclidean distance or cosine similarity techniques may be performed that compare the modified vector for the search request 402 with indexed vectors of documents in order to identify a number (e.g., top-k results) of documents with highest similarity to the modified vector. Search execution 410 may then identify the found document (s) in a search result 404.

Although FIGS. 2-4 have been described and illustrated in the context of a provider network implementing a search service, the various components illustrated and described in FIGS. 2-4 may be easily applied to other systems that implement vector-based searches. As such, FIGS. 2-4 are not intended to be limiting as to other embodiments of filter direction modifications to vector-based search.

Figure 5:
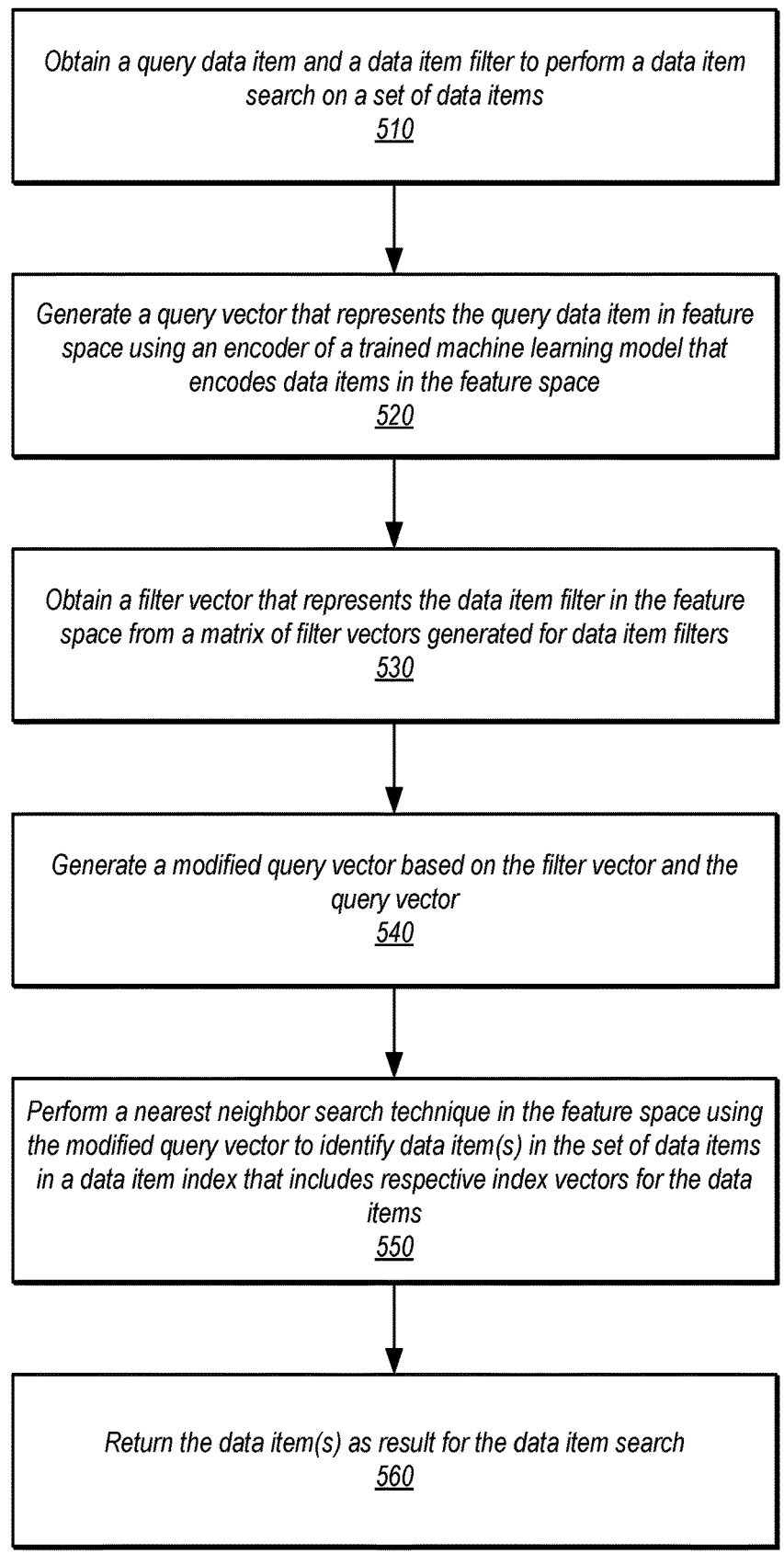
FIG. 5 illustrates a high-level flowchart of various methods and techniques to implement performing a vector-based data item search using filter direction modifications, according to some embodiments.

FIG. 5 illustrates a high-level flowchart of various methods and techniques to implement performing a vector-based data item search using filter direction modifications, according to some embodiments. Different systems and devices may implement the various methods and techniques described below, either singly or working together. Therefore, the above examples and or any other systems or devices referenced as performing the illustrated method, are not intended to be limiting as to other different components, modules, systems, or devices.

As indicated at 510, a query data item and a data item filter are obtained to perform a data item search on data items, in some embodiments. Various different types or styles of interface may be implemented through which the query data item and filter may be specified. For example, the query data item may be a natural language phrase entered via a text input element and the filter may be selected via a drop-down menu or other pre-populated filter set. In some embodiments, a text-prediction machine learning model may be trained or tuned to suggest different possible filters based on the query data item. In some embodiments, multiple data item filters may be specified.

As indicated at 520, a query vector is generated that represents the query data item in feature space using an encoder of a trained machine learning model that encodes data items in the feature space, in some embodiments. For example, the encoder may be implemented as one or more layers of transformer-based neural network model, that extracts and represents features of the input (e.g., query data item) as different feature values in different dimensions of a vector.

As indicated at 530, a filter vector is obtained, from a matrix of filter vectors generated for data item filters, that represents the data item filter in the feature space, in some embodiments. For example, a row value for the matrix may be determined according to mapping information between data item filters and rows. Then the values of the columns in the identified row may be the feature values in the filter vector for the data item filter. In some embodiments, the mapping information may be a one-hot encoding technique to determine which row in the matrix to use. As indicated at 540, the modified query vector may be generated based on the filter vector and the query vector. For example, in some embodiments, the filter vector is added to the query vector to generate a modified query vector, in some embodiments. Vector addition may be performed, adding the individual feature values of each dimension together to produce modified feature values of each dimension. If multiple filters are applied, then the multiple filter vectors and the query vector may be added together in the same fashion. In some embodiments, a filtering strength parameter, λ, may be multiplied by the filter vector(s), $f_v$, to increase or decrease their strength relative to the query vector, q. Accordingly, the modified query vector q̃, may be determined as q̃=q+λ*$f_v$. Other techniques to generate the modified query vector may include various linear combinations of the query vector and filter vector, including scalar multiplication, as well as various sets of linear combinations (e.g., in the event of multiple filter vectors being used, such as averaging techniques).

As indicated at 550, a nearest neighbor search technique is performed in the feature space using the modified query vector to identify data item(s) in the set of data items, in some embodiments. The search techniques may be performed using index vectors of data items in the set of data items. Various different nearest neighbor search techniques may be implemented, including, but not limited to k-NN, Hierarchical Navigable Small Worlds (HNSW), search techniques supported by Facebook™ AI Similarity Search (Faiss) library, ANN techniques, such as a graph-based index technique for approximate nearest neighbor search referred to as DiskANN, non-graph-based search techniques, such as locality sensitive hashing (LSH). These techniques may return a number of top scoring results, which may be specified as part of a search request, in some embodiments. As indicated at 560, the data item(s) are returned as a result for the data item search, in some embodiments.

Figure 6:
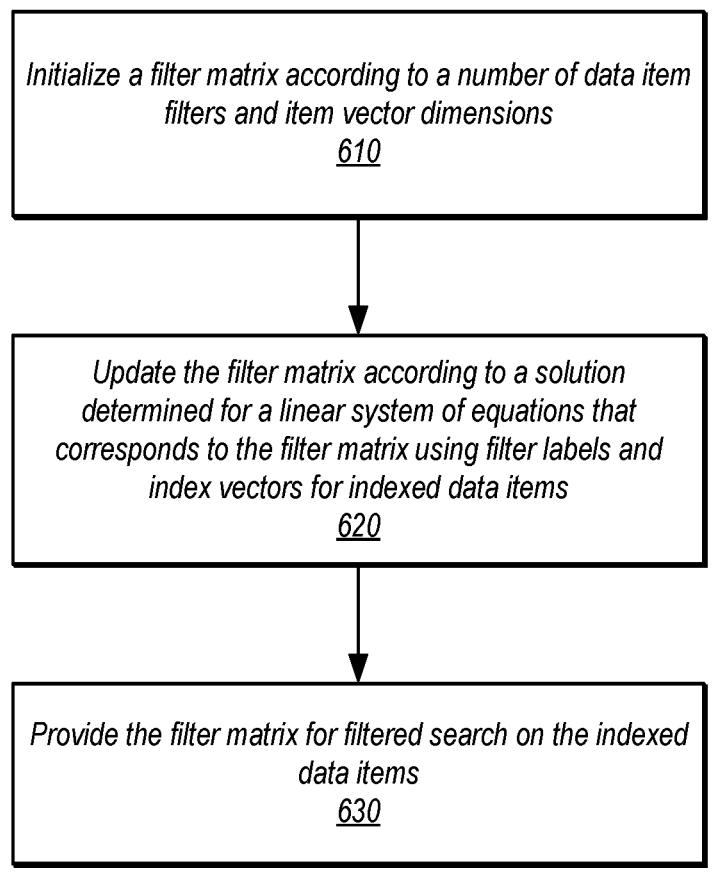
FIG. 6 illustrates a high-level flowchart of various methods and techniques to generate a filter matrix to determine a filter vector for modifying a vector-based data item search, according to some embodiments.

FIG. 6 illustrates a high-level flowchart of various methods and techniques to generate a filter matrix to determine a filter vector for modifying a vector-based data item search, according to some embodiments. As indicated at 610, a filter matrix, R, is initialized according to a number of data item filters and item vector dimensions, in some embodiments. For example, the values of individual columns in the rows may be set using the uncertainty set, $$\mathcal{U} = \left(-\frac{1}{\sqrt{d}}, \frac{1}{\sqrt{d}}\right),$$

where d is the dimensionality of the vectors. Then a mapping between filters and the rows of the matrix may be generated using one-hot encoding.

As indicated at 620, the filter matrix is updated according to a solution determined for a linear system of equations that corresponds to the filter matrix using filter labels and indexed vectors for indexed data items, in some embodiments. For example, R, may be treated or solved as a system of linear equations. In some embodiments, techniques, such as pseudo-inverses could be used to solve the system and determine the respective filter vectors that make up the filter matrix. In at least some embodiments, a neural network with a single linear layer (e.g., a linear probe) without bias followed by a softmax (e.g., a non-linear activation function that normalizes values passed through the softmax, from the single linear, to sum to 1) to learn this matrix. The training technique to learn the matrix may be a gradient descent based on the index vectors, P, of the data items (e.g., solve R·P=f for R using gradient descent).

As indicated at 630, the filter matrix for filtered search on the indexed data items is provided, in some embodiments. For example, the filter matrix may be stored, deployed, or sent to a search system.

The methods described herein may in various embodiments be implemented by any combination of hardware and software. For example, in one embodiment, the methods may be implemented on or across one or more computer systems (e.g., a computer system as in FIG. 7) that includes one or more processors executing program instructions stored on one or more computer-readable storage media coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 7:
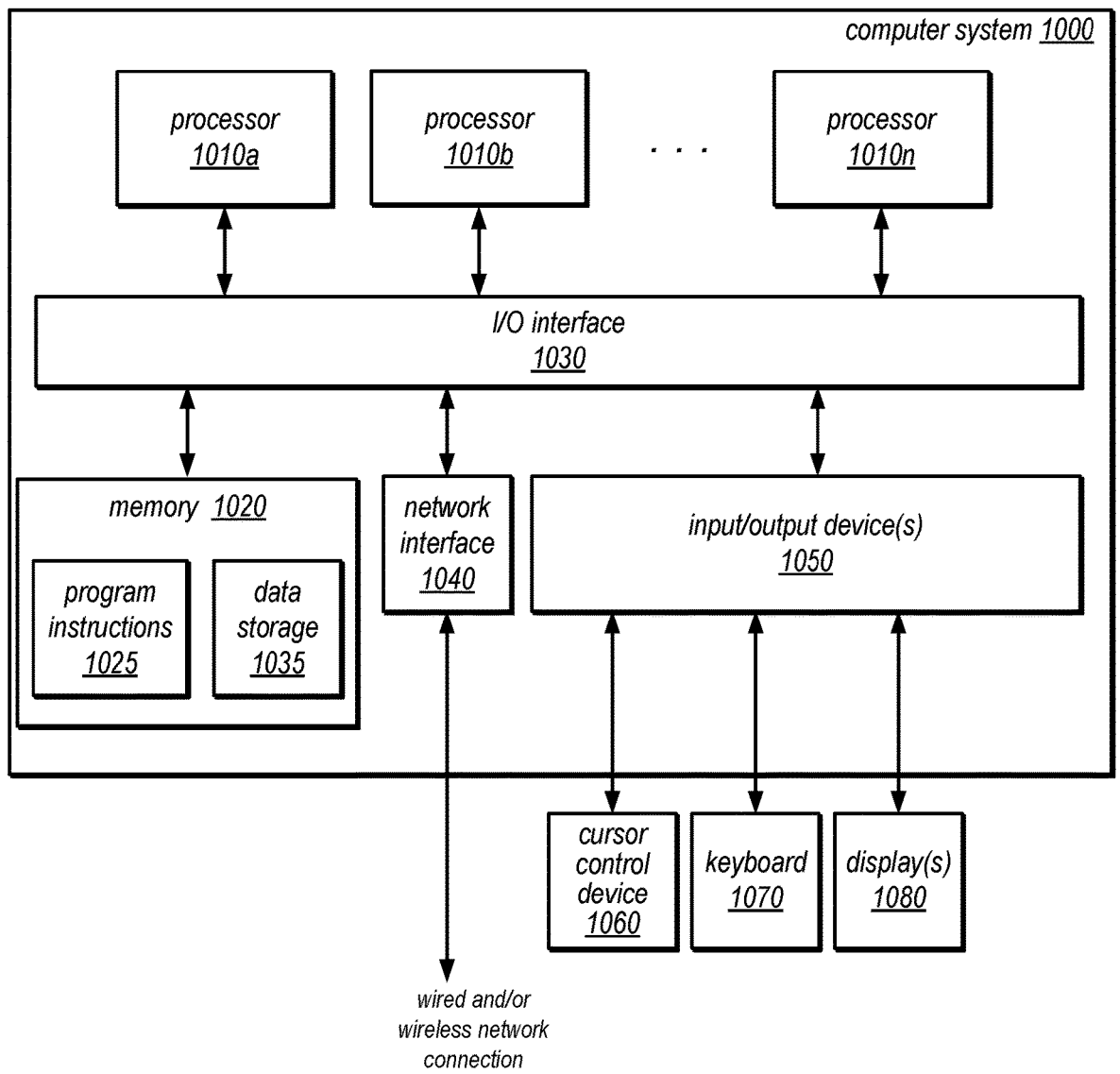
FIG. 7 illustrates an example system to implement the various methods, techniques, and systems described herein, according to some embodiments.

Embodiments of filter direction modifications to vector-based search as described herein may be executed on one or more computer systems, which may interact with various other devices. One such computer system is illustrated by FIG. 7. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical techniques. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above to implement monitoring time series model prediction performance are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 7, memory 1020 may include program instructions 1025, that implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may describe various operations that other systems may invoke, and may describe a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   at least one processor; and
   a memory, storing program instructions that when executed by the at least one processor, cause the at least the one processor to implement a search system, wherein the search system is configured to:
   receive a search request to perform on an indexed collection of data items, wherein the search request specifies query data item and a data item filter selected from a plurality of data item filters;
   generate a query vector that represents the query data item in feature space using an encoder of a trained machine learning model that encodes data items in the feature space;
   lookup a filter vector that represents a direction of the data item filter in the feature space from a matrix of filter vectors generated for the plurality of data item filters, wherein the matrix of filter vectors is generated by determining a solution to a linear system of equations corresponding to the matrix of filter vectors using the plurality of data items in the feature space;
   perform vector addition to add the filter vector to the query vector to generate a modified query vector;
   perform a nearest neighbor search technique in the feature space using the modified query vector to identify one or more data items of the plurality of data items in a data item index comprising respective index vectors for individual ones of the plurality of data items; and
   return the one or more data items as result for the data item search request.

2. The system of claim 1, wherein the search system is further configured to generate the matrix of filter vectors, wherein to generate the matrix of filter vectors, the search system is configured to:
   initialize the matrix of filter vectors according to a number of the data item filters and dimensions of the respective index vectors; and
   update the matrix of filter vectors using a neural network with a single linear layer to learn the filter vectors according to a gradient descent technique applied to the respective index vectors.

3. The system of claim 1, wherein the data item index is received at the search system having already been generated.

4. The system of claim 1, wherein the search system is a search service implemented as part of a provider network that provisioned a search cluster to perform the search request in response to a request to create a search domain for the plurality of data items with the plurality of data item filters.

5. A method, comprising:
   obtaining a query data item and a data item filter to perform a data item search on plurality of data items;
   generating a query vector that represents the query data item in feature space using an encoder of a trained machine learning model that encodes data items in the feature space;
   obtaining a filter vector that represents the data item filter in the feature space from a matrix of filter vectors generated for a plurality of data item filters, wherein the matrix of filter vectors provides respective directions corresponding to the plurality of data items in the feature space;
   generating a modified query vector based on the filter vector and the query vector;
   performing a nearest neighbor search technique in the feature space using the modified query vector to identify one or more data items of the plurality of data items in a data item index comprising respective index vectors for individual ones of the plurality of data items; and providing the one or more data items as result for the data item search.

6. The method of claim 5, further comprising generating the matrix of filter vectors, wherein the generating comprises:
initializing the matrix of filter vectors according to a number of the data item filters and dimensions of the respective index vectors; and
updating the matrix of filter vectors using a neural network with a single linear layer to learn the filter vectors according to a gradient descent technique applied to the respective index vectors.

7. The method of claim 6, wherein at least one of the plurality of data item filters is specified in a request to that causes creation of the filter matrix.

8. The method of claim 5,
wherein a further data item filter is obtained to perform the data item search, and wherein the method further comprises:
wherein the method further comprises obtaining a further filter vector that represents the further data item filter in the feature space from the matrix of filter vectors; and
wherein the adding comprises adding the further filter vector as part of adding the filter vector and the query vector to generate the modified query vector.

9. The method of claim 8, wherein the adding applies a filter weight to the filter vector before adding the filter vector to the query vector and wherein the filter weight is specified in a request.

10. The method of claim 5, wherein the obtaining the query data item and the data item filter, the generating the query vector, the obtaining filter vector, the adding the filter vector to the query vector, the performing the nearest neighbor search, and the returning the one or more data items as the result are performed by a search service implemented as part of a provider network and wherein the data item index is received at a search service having already been generated.

11. The method of claim 5, wherein the nearest neighbor search technique is one of a plurality of supported nearest neighbor search techniques and was specified in a request to select the nearest neighbor search technique.

12. The method of claim 5, wherein the query data item is a natural language phrase.

13. The method of claim 5, wherein the obtaining the query data item and the data item filter, the generating the query vector, the obtaining filter vector, the adding the filter vector to the query vector, the performing the nearest neighbor search, and the returning the one or more data items as the result are performed by a search cluster of a search service implemented as part of a provider network that provisioned the search cluster in response to a request to create a search domain for the plurality of data items with the plurality of data item filters.

14. One or more non-transitory, computer-readable storage media, storing program instructions that when executed on or across one or more computing devices cause the one or more computing devices to implement:
receiving a data item search request to perform on a plurality of data items given a query data item and a data item filter;
generating a query vector that represents the query data item in feature space using an encoder of a trained machine learning model that encodes data items in the feature space;
obtaining a filter vector that represents the data item filter in the feature space from a matrix of filter vectors generated for a plurality of data item filters, wherein the matrix of filter vectors is generated by determining a solution to a linear system of equations corresponding to the matrix of filter vectors using the plurality of data items in the feature space;
adding the filter vector to the query vector to generate a modified query vector;
performing a nearest neighbor search technique in the feature space using the modified query vector to identify one or more data items of the plurality of data items in a data item index comprising respective index vectors for individual ones of the plurality of data items; and
returning the one or more data items as result for the data item search request.

15. The one or more non-transitory, computer-readable storage media of claim 14, storing further program instructions that when executed on or across the one or more computing devices, cause the one or more computing devices to further implement generating the matrix of filter vectors, wherein the generating comprises:
initializing the matrix of filter vectors according to a number of the data item filters and dimensions of the respective index vectors; and
updating the matrix of filter vectors using a neural network with a single linear layer to learn the filter vectors according to a gradient descent technique applied to the respective index vectors.

16. The one or more non-transitory, computer-readable storage media of claim 15, wherein at least one of the plurality of data item filters is specified in a request to that causes creation of the filter matrix.

17. The one or more non-transitory, computer-readable storage media of claim 15, wherein the adding applies a filter weight to the filter vector before adding the filter vector to the query vector and wherein the filter weight is specified in a request.

18. The one or more non-transitory, computer-readable storage media of claim 14, wherein the data item index is received at the search system having already been generated.

19. The one or more non-transitory, computer-readable storage media of claim 15, wherein the nearest neighbor search technique is one of a plurality of supported nearest neighbor search techniques and was specified in a request to select the nearest neighbor search technique.

20. The one or more non-transitory, computer-readable storage media of claim 14, wherein the one or more computing devices are implemented as part of a search service implemented as part of a provider network that provisioned a search cluster to perform the search request in response to a request to create a search domain for the plurality of data items with the plurality of data item filters.

* * * * *